Patented June 30, 1931

1,812,675

UNITED STATES PATENT OFFICE

JAMES BADDILEY, ARNOLD SHEPHERDSON, AND ANTHONY JAMES HAILWOOD, OF BLACKLEY, MANCHESTER, ENGLAND, ASSIGNORS TO BRITISH DYESTUFFS CORPORATION LIMITED, OF MANCHESTER, ENGLAND

MANUFACTURE OF VALUABLE PRODUCTS FROM LIGNIN SULPHONIC ACID (SULPHITE CELLULOSE WASTE)

No Drawing. Application filed September 9, 1927, Serial No. 218,569, and in Great Britain December 7, 1926.

We have now found that by treating the ordinary commercial sulphite cellulose pitch in aqueous solution with oxidizing agents, new compounds are formed which differ from the original sulphite cellulose waste in that they do not give the Schiff reaction for aldehydes, and whereas the cellulose waste liquor in neutral dilute solution only gives a faint precipitate with barium chloride solution, the new products give a copious precipitate which can be filtered off and is soluble in hydrochloric acid. A further distinction is that although sulphite cellulose pitch reduces indigo in the presence of weak aqueous sodium hydroxide, the new products do not.

The new products possess in an enhanced degree the valuable dispersing and solubilizing properties of sulphite cellulose pitch and moreover have the important additional advantage of forming, when dried, a friable and non-hygroscopic mass. They find application in dyestuff preparations, whether as powder or as paste, the effect of their presence being to keep the dyestuff in easily dispersible form and to prevent coagulation and settling of dyestuff pastes. When added to an already dispersed dyestuff paste they enable the paste to be dried at moderately high temperatures to a powder which retains its power to disperse readily in water. Our products further find application in vat dye preparations, and in the dyeing of acetate silk.

It has been proposed to convert sulphite cellulose pitch by oxidation into oxalic acid, using a large proportion of concentrated nitric acid. In our invention, on the other hand, we moderate the degree of oxidation so as to avoid the formation of oxalic acid, which, of course, is the result of an extensive destruction of the compounds possessing the valuable properties we seek to retain.

The following is an example of the method of preparation of the new bodies, but we do not limit ourselves to the particular details thereof which can be varied within wide limits.

*Example.*—36 parts of sulphite cellulose pitch are dissolved in 150 parts of water. 8½ parts of 100% nitric acid are added and the whole heated with stirring on a steam bath. Considerable gas evolution occurs as evaporation proceeds, and ultimately no free nitric acid remains.

The product, which shows an acid reaction to litmus, may either be neutralized with ammonia and evaporated to dryness, or used directly.

What we claim and desire to secure by Letters Patent is:—

1. In combination a dyestuff paste or powder and the product of the moderated oxidation of sulphite cellulose pitch with nitric acid, the said combination being characterized by ready dispersibility in water.

2. In combination, a dyestuff paste or powder, and the product of the oxidation of sulphite cellulose pitch with nitric acid at boiling temperature, the said combination being characterized by ready dispersibility in water.

3. In combination, a dyestuff paste or powder, and the product of the moderate oxidation of sulphite cellulose pitch with diluted nitric acid at boiling temperature, the said combination being characterized by ready dispersibility in water.

In testimony whereof we affix our signatures.

JAMES BADDILEY.
ARNOLD SHEPHERDSON.
ANTHONY JAMES HAILWOOD.